(12) United States Patent
Miller et al.

(10) Patent No.: US 9,206,575 B2
(45) Date of Patent: Dec. 8, 2015

(54) ONBOARD OIL CONTAINMENT SYSTEM

(76) Inventors: Michael T. D. Miller, Covington, LA (US); Dorin Boldor, Baton Rouge, LA (US); Jeffrey D. Ortego, Baton Rouge, LA (US)

(\*) Notice: Subject to any disclaimer, the term of this patent is extended or adjusted under 35 U.S.C. 154(b) by 0 days.

(21) Appl. No.: 12/902,282

(22) Filed: Oct. 12, 2010

(65) Prior Publication Data

US 2011/0318109 A1  Dec. 29, 2011

Related U.S. Application Data

(60) Provisional application No. 61/358,566, filed on Jun. 25, 2010.

(51) Int. Cl.
*E02B 15/04* (2006.01)
*E02B 15/08* (2006.01)

(52) U.S. Cl.
CPC ........... *E02B 15/047* (2013.01); *E02B 15/0814* (2013.01); *E02B 15/0828* (2013.01); *E02B 15/0842* (2013.01)

(58) Field of Classification Search
CPC .. E02B 15/06; E02B 15/0871; E02B 15/0828
USPC .......................................... 405/60, 63, 68, 69
See application file for complete search history.

(56) References Cited

U.S. PATENT DOCUMENTS

| | | | |
|---|---|---|---|
| 2,682,151 A | 6/1954 | Simpson et al. | |
| 3,221,884 A * | 12/1965 | Muller | 210/242.3 |
| 3,494,132 A * | 2/1970 | Logan | 405/68 |
| 3,563,036 A * | 2/1971 | Smith | E02B 15/08 405/69 |
| 3,703,811 A * | 11/1972 | Smith | 405/68 |
| 3,729,589 A | 4/1973 | Bonsky et al. | |
| 3,798,911 A * | 3/1974 | Oberg | 405/69 |
| 4,104,884 A * | 8/1978 | Preus | 405/68 |
| 4,123,911 A * | 11/1978 | Finigan et al. | 405/68 |
| 4,325,653 A | 4/1982 | Teasdale | |
| 4,480,800 A * | 11/1984 | Oberg et al. | 242/535 |
| 4,652,173 A * | 3/1987 | Kallestad | 405/69 |
| 4,964,758 A * | 10/1990 | Pekelny | 405/66 |
| 4,993,871 A * | 2/1991 | Lundin | 405/68 |
| 5,022,785 A | 6/1991 | Goans | |
| 5,071,545 A * | 12/1991 | Ashtary | 210/153 |
| 5,087,152 A * | 2/1992 | Whidden | 405/68 |
| 5,143,479 A | 9/1992 | Whidden, Jr. | |
| 5,152,636 A * | 10/1992 | Myers | 405/68 |

(Continued)

FOREIGN PATENT DOCUMENTS

| | | |
|---|---|---|
| CA | 1065622 | 11/1979 |
| GB | 2250240 | 6/1992 |

(Continued)

*Primary Examiner* — Doug Hutton, Jr.
*Assistant Examiner* — Patrick Lambe
(74) *Attorney, Agent, or Firm* — Garvey, Smith, Nehrbass & North, L.L.C.; Gregory C. Smith; Julia M. FitzPatrick

(57) ABSTRACT

An oil containment system aboard a vessel which includes a pneumatic system to provide power to a winch and reel assembly containing boom whereby the pneumatic supply is capable of simultaneously powering the winch-reel assembly for boom deployment through inflatable gas fed to a pneumatic motor while also inflating the boom. The system would be utilized to confine a discharge of a floating material such as hydrocarbons floating on the surface from a vessel or structure.

31 Claims, 6 Drawing Sheets

(56) References Cited

U.S. PATENT DOCUMENTS

| | | | | |
|---|---|---|---|---|
| 5,169,526 A * | 12/1992 | Gould | | 210/242.3 |
| 5,183,579 A * | 2/1993 | Eller | | 210/776 |
| 5,197,821 A * | 3/1993 | Cain et al. | | 405/68 |
| 5,246,394 A * | 9/1993 | Jensen | | 441/133 |
| 5,253,953 A * | 10/1993 | Whidden, Jr. | | 405/63 |
| 5,298,175 A * | 3/1994 | Whidden, Jr. | | 210/776 |
| 5,312,204 A | 5/1994 | Goans | | |
| 5,338,132 A * | 8/1994 | Lahar et al. | | 405/69 |
| 5,346,329 A * | 9/1994 | Goans et al. | | 405/68 |
| 5,362,180 A * | 11/1994 | Canning et al. | | 405/66 |
| 5,372,455 A | 12/1994 | Tarca | | |
| 5,374,133 A * | 12/1994 | Lazes et al. | | 405/68 |
| 5,478,168 A * | 12/1995 | Carr et al. | | 405/63 |
| 5,480,261 A * | 1/1996 | Meyers et al. | | 405/63 |
| 5,522,674 A * | 6/1996 | Cooper | | 405/63 |
| 5,580,185 A * | 12/1996 | Ware | | 405/72 |
| 5,584,604 A * | 12/1996 | Osterlund | | 405/68 |
| 5,688,074 A * | 11/1997 | Schiwek | | 405/63 |
| 5,688,075 A * | 11/1997 | Gradek | | 405/63 |
| 5,711,634 A * | 1/1998 | Oberg | | 405/66 |
| 5,720,678 A * | 2/1998 | Korthauer | | 473/415 |
| 6,073,382 A * | 6/2000 | Willener | | 43/4.5 |
| 6,221,256 B1 * | 4/2001 | Kimura | | 210/747.6 |
| 6,485,229 B1 * | 11/2002 | Gunderson et al. | | 405/63 |
| 6,655,872 B1 * | 12/2003 | Johnson | | 405/66 |
| 6,942,422 B2 * | 9/2005 | Byrd et al. | | 405/63 |
| 7,326,354 B2 * | 2/2008 | Ferreira | | 210/776 |
| 2003/0062297 A1 * | 4/2003 | Rosquist | | 210/242.3 |
| 2003/0082006 A1 * | 5/2003 | Dreyer | | 405/63 |
| 2011/0299931 A1 * | 12/2011 | Schaus | | 405/63 |
| 2012/0020732 A1 * | 1/2012 | Stiles et al. | | 405/63 |
| 2012/0027518 A1 * | 2/2012 | Van Houten, Jr. | | 405/63 |

FOREIGN PATENT DOCUMENTS

| | | |
|---|---|---|
| KR | 20000002136 A | 1/2000 |
| KR | 100261952 | 7/2000 |
| KR | 200321706 | 7/2003 |
| RU | 59644 U1 | 12/2006 |

* cited by examiner

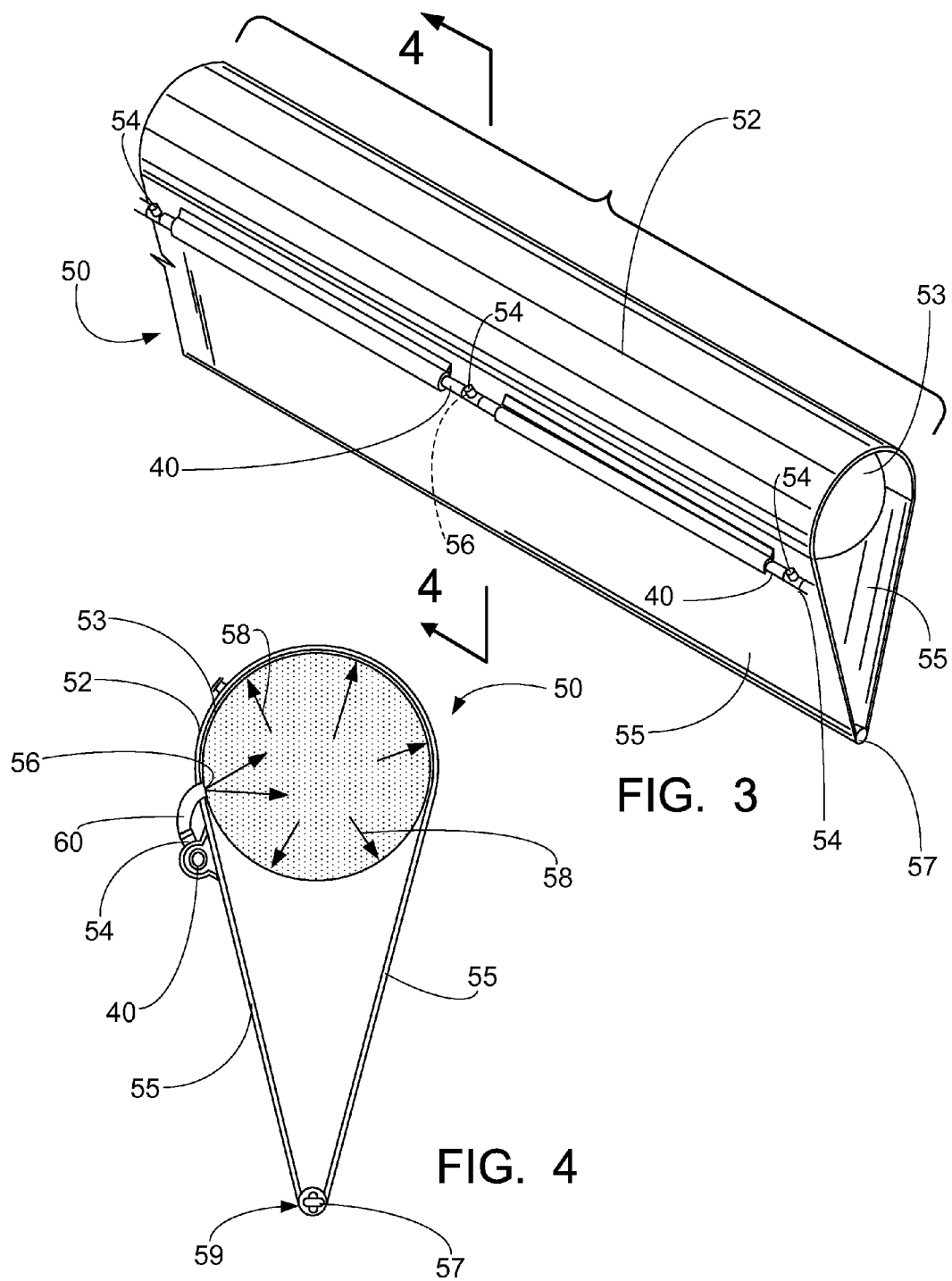

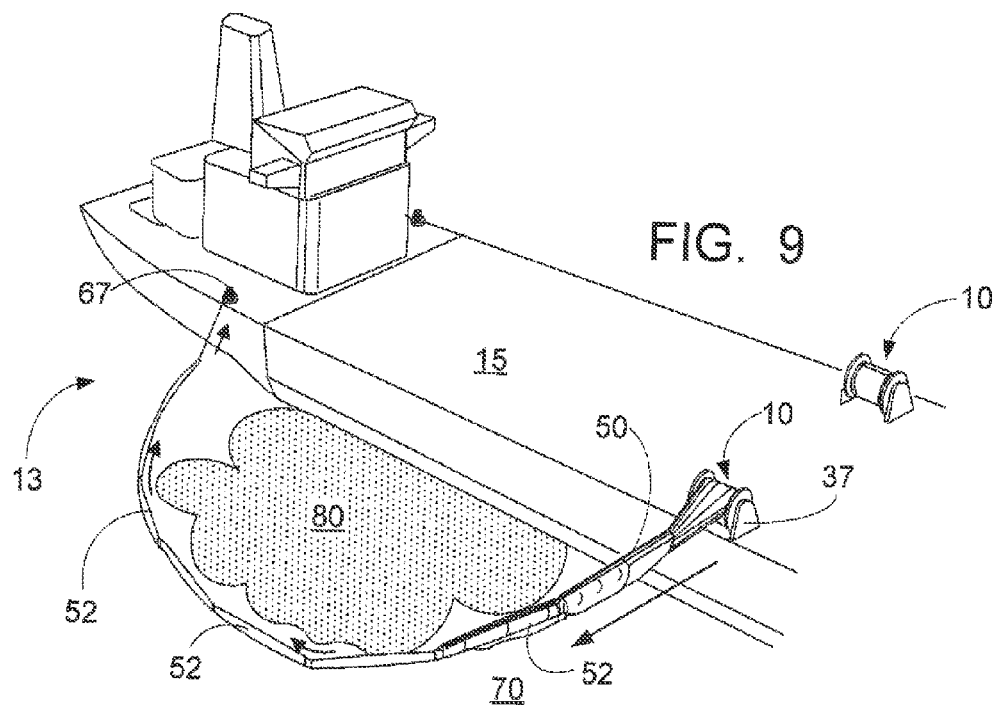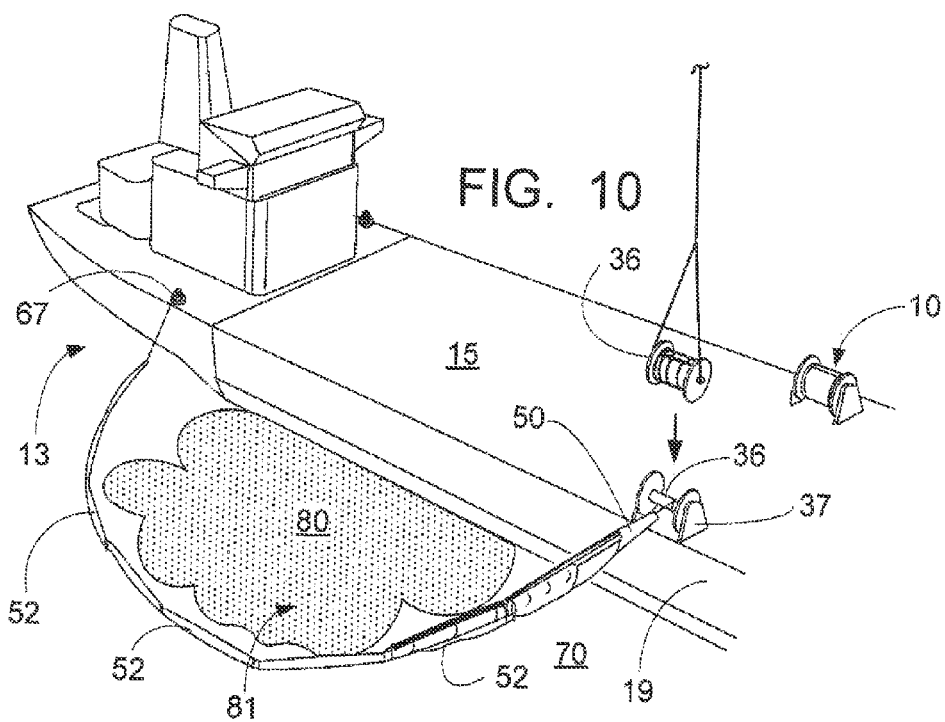

ONBOARD OIL CONTAINMENT SYSTEM

CROSS-REFERENCE TO RELATED APPLICATIONS

Priority of U.S. Provisional Patent Application Ser. No. 61/358,566, filed Jun. 25, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

This invention pertains to a system, its devices and methods, for housing, deploying and maintaining a floating barrier or boom for restraining and collecting floatable material, such as hydrocarbons, floating on the surface or just below the surface of a body of water. More particularly this invention pertains to a system, its devices and methods, that allow for rapid deployment of floating barriers by a novel floating barrier delivery, deployment and Inflation system.

2. General Background of the Invention

For many years conventional floating oil booms or barriers have been used in an attempt to contain floating material, such as hydrocarbons, on the surface, or just below the surface, of a body of water. Conventional floating booms are either housed on a marine vessel or on land in an deflated state. When needed these booms are deployed by attaching the leading end of the boom to a deployment vessel which tows the boom into place and inflates the boom from the leading first-off end. These booms are normally comprised of an elongated tubular body, sometimes sectioned into self-contained inflatable gas bladders, that is produced by the inflation of a sealed tube, or each inflatable gas bladder, to which an oil confining skirt or flap suitable for containing floatable material is attached. See for example U.S. Pat. Nos. 2,682,151 and 3,494,132 which disclose a series of plastic tubes which are interconnected by sleeves with the plastic tubes then being inflated to achieve the inflated state. Also, see for example U.S. Pat. No. 4,325,653 that discloses dual inflatable tubes with a skirt in between with said inflatable tubes being inflated with external inflatable gas hoses.

Also, see U.S. Pat. No. 4,123,911 which discloses a gas-inflatable boom wherein a single inflatable boom is inflated from an inflatable gas supply on the deploying vessel. All the patents cited above contemplate inflation from the leading edge of the boom one section at a time and do not disclose any method for the continuous inflation of the boom from a single inflatable gas source originating at the lagging last-off section of boom that runs concurrently with the boom, nor do they disclose inflation from an inflatable gas source already connected to the boom prior to deployment.

U.S. Pat. No. 3,729,589 discloses a collapsible boom containing an individual inflation chamber, however each inflation chamber must be connected to an inflatable gas supply and inflated separately as the boom is deployed. This greatly increases the time and complexity of inflation and deployment. U.S. Pat. No. 3,729,589 makes no mention of an equalized, pressurized inflatable gas supply running concurrently with the boom to allow for rapid inflation.

U.S. Pat. No. 5,022,785 discloses a method wherein a reactant body is contained within the boom itself such that by mechanical action the reactants can be activated to release an inflating gas by chemical reaction. After inflation by chemical reaction of the reactant the boom is inflated with pressurized inflatable gas from the first-off, or leading, end to ensure proper Inflation. Thus the boom may only be used a single time and then must be replaced.

Both U.S. Pat. Nos. 5,022,785 and 5,346,329 disclose individualized compartments or compartments separated by valves for the purpose of preventing deflation of an entire section of boom. Neither of these patents discloses an inflatable gas being supplied to the individual compartment from an external, individualized source.

Thus the above patents and current practices employed to respond to discharges of floatable material on water surfaces, such as hydrocarbons, fail to disclose a rapidly deployable system incorporating a retaining boom that can be deployed from a single point without need for multiple power sources, which can withstand ruptures and leaks. The patents recited above also are restricted in the functional length of a single floating barrier, or boom, because they lack an inflatable gas delivery line that runs concurrently with the entire length of boom. Further, current methods and practices require that vessels for the deployment and inflation of the boom, containment machinery and booms be transported, often from considerable distances, to the site of a discharge on the water. This delay results in increased, uncontained discharges of toxins onto the water. Consequently, it is an object of this present invention to provide for an on-site or on-board system that incorporates a power system and inflatable gas supply to the winch-reel (assembly and boom that will allow rapid boom deployment, control of the winch-reel assembly and control, the rate of deployment of the boom from a reel or other storage area.

Another object of this invention is to provide for a power system for rewinding of deployed boom onto a reel or other storage area without interruption to already inflated areas of the boom.

Another object of this invention is to provide a floating barrier deployment system that can be deployed and inflated from a single point inflatable gas supply originating from the lagging, or last-off, end of the boom.

Still another object of this invention is to supply inflatable gas to the boom, or inflatable gas bladders or inflatable gas compartments within the boom, from an individualized inflation point directly associated with the specific boom for inflatable gas bladders or inflatable gas compartments within the boom, said inflatable gas supply originating from the inflatable gas delivery hose in the proximity of the lagging, or last-off, end of the boom and having an equalized internal pressure not exceeding the pressure containing capabilities of the boom, or inflatable gas bladders or inflatable gas compartments within the boom.

Still another object of this invention is to supply an inflatable gas to the boom, or inflatable gas bladders or inflatable gas compartments within the boom, from an individualized inflation point directly associated with the specific boom, or inflatable gas bladders or inflatable gas compartments within the boom, such that the inflatable gas is supplied through a hose running externally and concurrently with the boom.

This design allows for the boom to be continuously inflated from an inflatable gas supply originating from the inflatable gas delivery hose in the proximity of the non leading, or last-off, end of the boom.

Yet another object of this invention is to provide inflating medium, such as air, to inflate the floating barrier from a single point supply that can inflate the entire floating barrier and continuously maintain inflation of the floating barrier once deployed and inflated.

Yet another object of this invention is to provide for a containment system that can be rapidly transported via helicopter to a discharge, site for rapid deployment.

Still another object of this invention is to provide a floating barrier deployment system and floating barrier that is not limited in the length of the floating barrier that can be deployed, inflated and maintained in an inflated state.

Furthermore, it is an object of this invention to provide a control mechanism for deployment, Inflation and maintenance of inflation of a floating barrier that allows the operator to control, from a single point, the rate of deployment and inflation of a floating barrier.

Yet another object of this invention is to allow for a floating barrier deployment system and floating barrier to be housed on marine vessels or at stationary points, including without limitation docks, ports, shores, islands, seawalls, dikes, skimming vessels, barges, ocean going vessels, rescue vessels, drilling rigs, boats, and pontoons.

Yet another object of this invention is to allow for the deployment, inflation, maintenance and directional control of the deployed and inflated boom without the use of a secondary deployment vehicle.

Still another object of this invention is to allow for the directional control of the deployed, inflated boom without the benefit of a secondary deployment vessel.

Additionally, it is an object of this invention to deploy the containment system without requiring the use of electrical supply or electrical controls.

The following U.S. patents are incorporated herein by reference:

TABLE

| PATENT NO. | TITLE | ISSUE DATE |
|---|---|---|
| 2,682,151 | Boom for confining material floating on water | 1954 Jun. 29 |
| 3,494,132 | Inflatable float boom | 1970 Feb. 70 |
| 3,729,589 | Adapter Unit for Telephone Answering Instrument | Apr. 24, 1973 |
| 4,325,653 | Oil containment booms | 1982 Apr. 20 |
| 5,022,785 | Floating barrier method and apparatus | 1991 Jun. 11 |
| 5,346,329 | Floating barrier method and apparatus | 1994 Sep. 13 |

BRIEF SUMMARY OF THE INVENTION

What is disclosed is a system for containment for floating material, such as hydrocarbons, floating on a liquid surface, including without limitation an inflation apparatus, floating barrier deployment system, floating barrier inflation system and methods for the same. The present invention allows for rapid deployment and inflation of a floating barrier and the continuous inflation of said floating barrier by supplying an inflatable gas to the boom, or inflatable gas bladders or inflatable gas compartments within the boom, from an individualized inflation point directly associated with the specific boom, or inflatable gas bladders or inflatable gas compartments within the boom, said inflatable gas supply originating from a source not connected to the leading, or first-off section of boom, preferably originating from the lagging, or last-off, end of the boom and having an equalized internal pressure not exceeding the pressure containing capabilities of the boom, or inflatable gas bladders or inflatable gas compartments within the boom.

This present invention, through novel, useful and non-obvious means, solves problems associated with the current state of the art in deployment, inflation, directional control and use of inflatable barriers, including without limitation 1) the need for separate deployment vessels and/or service vessels required for deployment, inflation and subsequent maintenance of the buoyancy of the floating barrier, 2) the deflation of sections of the floating barrier rendering it useless or less effective, 3) the need for multiple systems or power supplies for the deployment, inflation and inflation control of the floating barrier, 4) the fact that current floating barrier systems are restricted in the functional length of a single floating barrier and must link together multiple floating barriers to achieve suitable lengths of floating barrier to retain large areas of material floating upon a liquid surface, such as hydrocarbons, 5) the fact that earlier disclosed or practiced methods for the containment of floating material, such as hydrocarbons, floating on a liquid surface are too large to be housed on-site at the shore or on-board marine vessels, and 6) the fact that earlier disclosed or practiced methods for the containment of floating material, such as hydrocarbons, floating on a liquid surface require the use of a separate marine vessel to accomplish, either in whole or in part, the delivery, deployment, directional control and inflation of the containment system.

The present invention may be manufactured as part of newly manufactured boom or retrofitted to already existing boom. The present invention uses a pneumatic system to provide power to the winch and reel assembly containing boom whereby the pneumatic supply is capable of simultaneously powering the winch-reel assembly for boom deployment through inflatable gas fed to a pneumatic motor while also inflating the boom. The inflation of a boom is accomplished by diverting, all or any portion thereof, the inflatable gas from a pneumatic supply through a hose that runs concurrently on the outside of the boom wherein appropriate rates of inflatable gas pressure are allowed to flow through the hose to feed through a valve and hose assembly that connects the inflatable gas supply of the hose to the inflatable gas containment system of the boom. In preferred embodiments the pneumatic supply originates from a single pneumatic system powering both the winch and reel assembly as well as associated brake and feeding inflatable gas pressure to the inflation hose running concurrently with the boom.

The present invention may be manufactured in a form such that it is compact enough to be installed in, or rapidly transported to, any area or place or vessel where there is likelihood of a discharge of floating material, such as hydrocarbons, floating on a liquid surface. The present invention may also be operated through the use of pneumatic control without the benefit of electric power making it particularly useful for applications in remote areas or during a disaster when electrical power is not readily available.

The present invention allows for single source boom deployment, Inflation of floating barriers during boom deployment, as well as maintenance or emergency refill as needed from an Inflation source that is located in close proximity to the winch-reel assembly at or near the lagging Or last-off section of boom. This is notably different from current floating barrier containment systems where the boom inflation methods require a second vessel to deploy the boom and the boom is inflated from the leading end, or first-off boom section, of the already deployed section of boom as compared to the present invention that preferably fills the boom from the lagging end, or last-off boom section, as the boom, or sections of boom, are released from the winch-reel assembly.

The present invention may also employ a guide line or wire that is also deployed from the same vessel or fixed site from which the boom is deployed. As a portion of the present invention the guide line or wire may be maintained on or fixed to the deploying vessel or be maintained on or attached to a land based site. In this invention the opposite end of the guide wire is attached to the leading end of the floating barrier as it is deployed, inflated and maintained from the winch-reel assembly allowing an individual to guide the direction of the boom from the vicinity of the deployment system while the boom is being deployed, inflated and maintained. This guide wire may also be transported across and around a vessel or land based site to allow for greater control of the direction of the boom as it is being deployed, inflated and maintained. It is also possible to employ a secondary vessel to guide the direction of the boom as it is deployed, inflated and maintained. It is also possible to have the vessel to which the guide wire is attached maneuver to control the direction of the boom as it is deployed, inflated and maintained.

Because of the many varying and differing embodiments and component parts that may be used with the Present Invention, yet still within the scope of the inventive concept taught herein, and because modifications may be made In the embodiment herein detailed in accordance with the descriptive requirement of the law, it is to be understood that the details disclosed are to be interpreted as illustrative and not limiting in any way.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is an overall view of a section of boom in the preferred embodiment of the system of the present invention;

FIG. 4 is a cross section view of a section of boom as illustrated in FIG. 3;

FIGS. 7 through 9 illustrate sequential views of the length of boom being released from a vessel to capture an oil spill emanating from the vessel in the system of the present invention; and FIG. 10 illustrates a reel of boom having been emptied and another being set it its place to allow further deployment of boom.

DETAILED DESCRIPTION OF THE INVENTION

Figure 1:
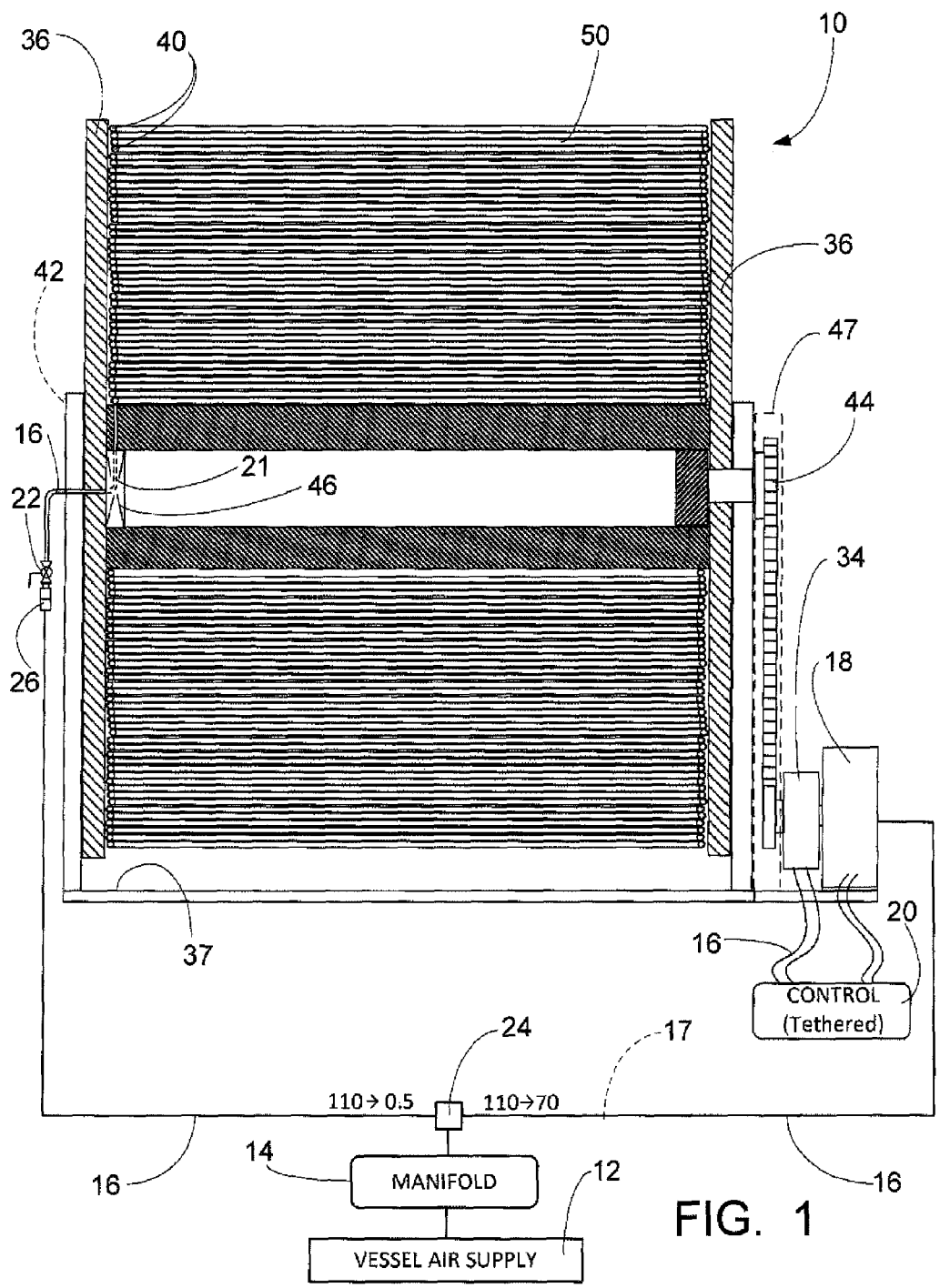
FIG. 1 is a schematic view of the preferred embodiment of the system of the present Invention.

Without departing from the principle of the invention, and without limitation to other embodiments, an exemplary embodiment of the present invention will now be described by way of example only and includes, without limitation, an onboard or onsite pneumatic system located in the proximity of the winch-reel assembly, a manifold connected by a valve, and in preferred embodiments quick-connect coupling, to the inflatable gas supply, a control box receiving inflatable gas supply from the manifold and connected and controlling a motor and brake on the winch-reel assembly, an inflatable gas supply passing through a manifold and then, interchangeably, a pressure regulator and a control valve or boom inflation valve to the inflatable gas delivery hose attached to, and running concurrently with the boom as contained on the winch-reel assembly. During deployment, said inflatable gas delivery hose supplying an inflatable gas to the boom, or inflatable gas bladders or inflatable gas compartments within the boom, from an individualized inflation point directly associated with the specific boom, or inflatable gas bladders or inflatable gas compartments within the boom, said inflatable gas supply first passing through the delivery hose from the lagging, or last-off, end of the boom and having an equalized internal pressure not exceeding the pressure containing capabilities of the boom, or inflatable gas bladders or inflatable gas compartments within the boom. In other embodiments the power source for the various components of the present invention may also be, without limitation, hydraulic or electric or fuel driven.

Without departing from the principle of the invention, and without limitation to other embodiments differing in size, scope or boom length, and prior to a discussion of the FIGS. 1 through 10, an exemplary embodiment of the present invention will be described by way of example only.

In an exemplary embodiment, for the purposes of inflating the inflatable section of the boom, when the inflatable gas supply is engaged such that inflatable gas is supplied to the inflatable gas supply lines, either directly or through a manifold, the inflatable gas travels through one inflatable gas supply line and the pressure of the inflatable gas supply line is controlled by a pressure regulator wherein the pressure of the inflatable gas is decreased from the original pressure to a pressure suitable for inflation of the boom. The inflatable gas traveling through the inflatable gas supply line is allowed to continue to flow through the inflatable gas supply line supplying inflatable gas to the boom by the opening and closing of a boom inflation valve. When the boom inflation valve is in the open position, inflatable gas will travel at a pressure suitable for inflation of the boom through the inflatable gas supply line to inflate the boom. The inflatable gas supply from the inflatable gas supply line can enter the boom directly through the inflation/deflation port on the inflatable section of the boom, or alternatively, the inflatable gas supply from the inflatable gas supply line can enter the inflatable section of the boom via a jumper hose that connects the inflatable gas supply line to the inflatable section of the boom. The inflatable gas supply line can be attached to the boom and run the entire length of the boom and inflate multiple inflatable sections of the boom either in series or simultaneously.

By maintaining the appropriate pressure of inflatable gas within the inflatable gas supply line the boom can be maintained in an inflated state, or alternatively a pressure valve inserted in the—inflation/deflation port of the inflatable section of the boom can be selected and inserted into the inflation/deflation port connected to the inflatable gas supply, either directly or by use of a Jumper hose, such that the pressure valve automatically closes when the inflatable section of boom is inflated thus maintaining the inflatable section of the boom in an inflated state. If the pressure in the boom drops below a certain threshold a pressure valve on the inflation/deflation port may be selected such that it opens to allow additional inflatable gas from the inflatable gas supply line to enter the boom to re-inflate the inflatable section of boom or to maintain the inflatable section of boom in an inflated state.

In other embodiments no such pressure valve is needed as the pressure of inflatable gas supply in the inflatable gas supply lines connected to the inflatable section of the boom may be otherwise controlled for maximum effective inflation of the inflatable sections of the boom. This manner of supplying inflatable gas to the inflatable sections of a boom through inflatable gas supply lines can allow for an inflatable gas supply line running concurrently with the boom such that the inflatable gas supply traveling through the inflatable gas supply lines passes first by the portion of the inflatable gas supply line associated with the lagging, or last-off, section of the boom.

For the purpose of operating the winch-reel assembly, when the inflatable gas supply is engaged such that inflatable gas is supplied to the inflatable gas supply lines, either directly or through a manifold, the inflatable gas will travel through inflatable gas supply lines to the motor and also to the pneumatic control mechanism. The inflatable gas delivered by the inflatable gas supply lines to the pneumatic control mechanism can then be controlled by the pneumatic control mechanism such that supply of inflatable gas delivered through the inflatable gas supply lines can operate the motor in the forward and reverse directions and separate inflatable gas supply lines funning from the pneumatic control mechanism to the brake/clutch mechanism can control the engagement and disengagement of the motor from the winch-reel assembly. Thus, through the use of inflatable gas supplied to the motor and pneumatic control mechanism the motor can be operated and engaged such that the boom housed on the winch-reel assembly can be deployed or returned to the winch-reel assembly. When working in concert the application of the inflatable gas supply as described above allows an operator to control the deployment of boom from the winch-reel assembly and inflation of the boom as it is deployed from the winch-reel assembly from a single, localized area allowing for greater speed of deployment and inflation of the boom to contain floatable materials floating on a liquid surface.

In an exemplary embodiment, once the first length of boom is deployed from the first reel as described the empty reel can be removed from the winch-reel assembly and additional reels of boom can be inserted and connected to the winch such that the winch-reel assembly is capable of deploying additional lengths of boom on a repeated, or continual, basis as described. The inflatable gas supply lines allows for inflation of the boom presently being deployed from the winch-reel assembly as well as the maintenance of the inflatable gas pressure throughout the entire length of the inflatable gas supply lines of all segments of boom that have previously been deployed allowing for the maintenance of the inflation of the boom as herein described. Alternatively, the length of boom may be maintained from another vessel.

FIGS. 1 through 10 illustrate the preferred embodiment of the containment system of the present invention by the numeral 10. In FIG. 1, system 10 would comprise a vessel inflatable gas supply 12, provided on a vessel 13, such as a container ship or tanker or the like ship. The gas supply 12 is connected to a manifold 14 such that an inflatable gas (Arrow 17) generated by the vessel inflatable gas supply 12 is passed from the vessel inflatable gas supply 12 at an approximate pressure of 100 p.s.i, which may deviate higher or lower depending on circumstances, to the manifold 14 by connecting hoses 16. The inflatable gas 17 is then distributed by the manifold 14 to a motor 18, the control 20, and the boom inflation valve 22 by connecting hoses 16. The connecting hoses 16 connecting the manifold 14 to the control 20 and the boom inflation valve 22 will have varying p.s.i. as controlled by the associated first PSI pressure regulator 24 and second PSI pressure regulator 26, respectively, or in place of the two regulators 24, 26, a single, dual functioning pressure regulator. The manifold 14 will distribute an inflatable gas 17 through the connecting hoses 16 to the motor 18 at an approximate pressure of 100 p.s.i., which may deviate higher or lower depending on circumstances. The manifold 14 will distribute an inflatable gas 17 through the connecting hoses 16 passing through the PSI pressure regulator 24 to the control 20 at an approximate pressure of 70 p.s.i., which may deviate higher or lower depending on circumstances. The manifold 14 distributes an inflatable gas 17 through the connecting hoses 18 passing through the PSI pressure regulator 26 to the boom inflation valve 16 at approximately 0.5 p.s.i. or a pressure suitable to attain inflation of the boom.

The control 20 will operate to pneumatically control the forward (Arrow 30) and reverse (Arrow 32) action of the motor 18. Although the term "gas" is used in this discussion, it is foreseen that the preferred "gas" will be air under certain pressures, although other gases may be utilized. The control 20 will also operate to pneumatically control the brake/clutch 34 through control to engage or disengage motor 18. The motor 18 is thus operated by distribution of inflatable gas from the manifold 20 to the motor 18 that operates the action of the reel 36 based upon the direction of the operator through actuation of the control 20 to engage or disengage motor 18 and direct rotation of the reel 36 by the control 20 operating the motor 18 to cause rotation of the reel 36 in the forward or reverse direction. As seen in FIG. 1, in the preferred embodiment, the reel is engaged to the motor via a belt 44, or chain which may be encased in a housing 47, as seen in phantom view. Alternatively, the reel 36 may be driven by an internal gear.

As the reel 36 is rotated in the forward direction to deploy boom with inflatable gas delivery supply lines 40 attached at point 42 from the reel 36 the boom inflation valve 22 is opened by the operator such that inflatable gas passes through the rotorseal valve 46 and then passing through the inflatable gas delivery supply line 40 as attached to the lagging or last-off section of boom 50. The air travels within the inflatable gas delivery supply line 40 running concurrently with the boom 50, and ultimately inflating the sections 52 of the boom 50 as it is deployed from the reel 36.

Figure 2:
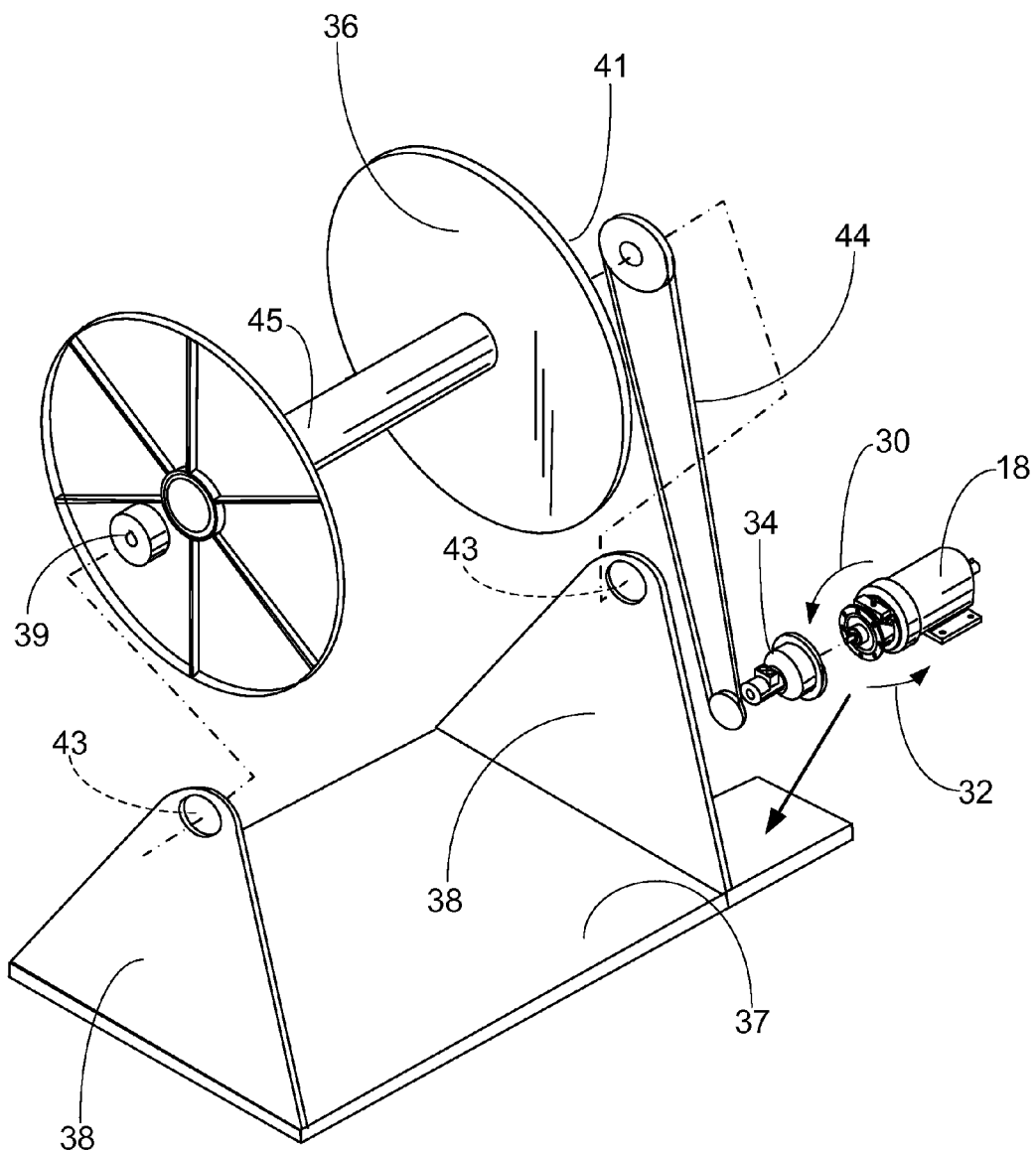
FIG. 2 is an exploded view of the preferred embodiment of the spool portion of the system of the present invention.

In FIG. 2 there is illustrated an exploded view of the system 10, wherein the reel 36 would be mounted onto a base 37 secured onto the deck 15 of the vessel 13. As discussed earlier, the reel 36 would rotate freely with the ends 39, 41 of the reel 36 engaged in openings 43 in the upright sidewalls 38 in base 37. As further illustrated, motor 18 would likewise be mounted on base 37, and would include the belt 44 for imparting rotation of reel 36 when the motor is powered from the control 20, and the speed of rotation of the reel 36 is provided by the brake/clutch 34, as was discussed earlier and will be discussed below. Alternatively, it should be noted that the motor 18 could be positioned directly in the hub 45 of reel 36, to impart a direct drive of the reel 36, rather than use the belt 44 to drive the reel 36.

FIGS. 3 and 4 illustrate overall and cross-section views respectively of an inflated section 52 of a boom 50. The section 52 comprises the inflatable gas delivery line 40, which is attached into a stainless tee fitting 54 and a deflation/inflation port 56 allowing for inflatable gas (Arrows 58) to be delivered into the inflatable section 52 of the boom 50 through a jump hose 60. Inflatable gas 17 travels through the inflatable gas delivery line 40 at a pressure of 0.5 p.s.i., or a pressure equal to the maximum pressure allowable in the inflated boom, and then into the jump hose 60 by traveling into the jump hose 60 through the stainless tee 54. The inflatable gas 17 then flows from the jump hose 60 through the deflation/inflation port 56 into the inflatable section 52 of the boom 50, inflating the section 52 of boom 50 with the gas 58. Alternatively, the jump hose 60 may not be required, and the gas 17 flows from delivery line 40 through tee 54 and into port 56. As seen further in FIGS. 3 and 4, the section of boom 50 is designed in a first upper inflatable chamber 53, which is circular in cross-section when inflated, and a skirt portion 55, which envelopes around the chamber 53, and terminates at a point 59 below the chamber 53, to a weighted lower end 57. As illustrated, while the inflated boom portion 53 floats on the water, the weighted lower end 57 pulls the skirt 55 below the surface 71 of the water 70 to serve as a barrier against any oil escaping below the inflated portion 53.

Figure 6:
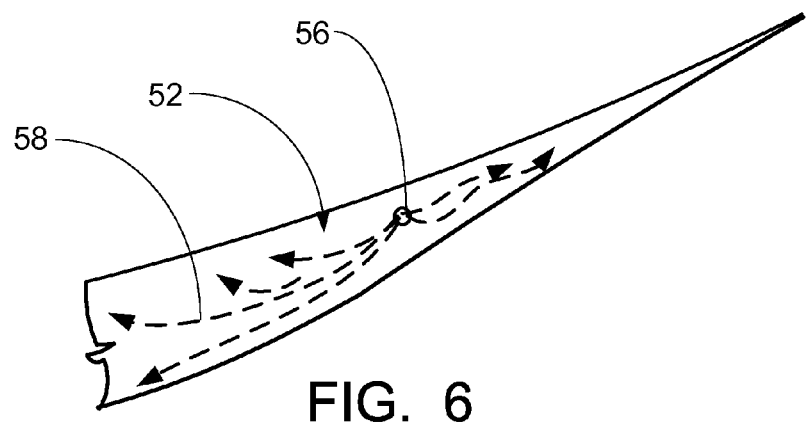
FIG. 6 is an interior view of the section of boom illustrated in FIG. 5 illustrating the air as it is entering the section of boom to inflate the section of boom.
Figure 5:
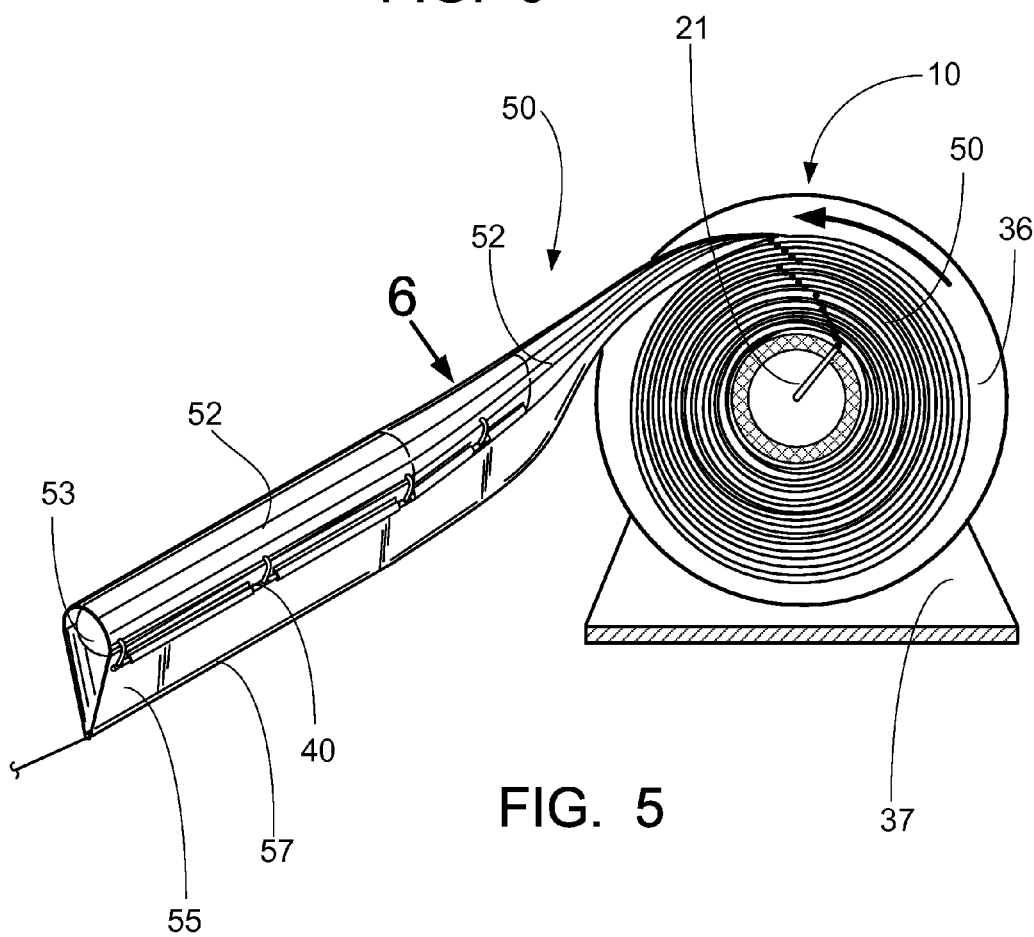
FIG. 5 is a cross section view of the reel containing the entire length of deflated boom in the system of the present invention with a section of boom having been inflated after it has left the reel.

As shown in FIG. 5, the gas or air is being delivered from gas line 16 into the gas delivery line 40 through the rotoseal valve 21, which allows the reel 36 to rotate while air is being delivered into line 40. Further, as seen in FIG. 1, and FIGS. 5 and 6, the gas delivery line 40 is attached along the entire length of boom 50 as it is wound around the reel 36, and while wound around the reel 36, the gas delivery line 40 is delivering gas along the entire length of boom 50. However, due to the weight of the boom 50 as it is wound on the reel 36, the inflation of the boom 50 will not take place at the force of 0.5 lbs. per square inch until the boom comes off of the reel 36. As seen in FIG. 6, when a section 52 of boom 50 reels off of reel 36, the air delivery line 40 will deliver air (Arrows 58) into the section 52 which is being released from the reel 36 through the inflation port 56. Likewise, after that section 52 is released and inflated, the next section 52 will be released from the reel 36 and inflated. This process is repeated until the entire length of boom 50 has been deployed to the required length. In this manner, should a section 52 be torn or ruptured, and the gas escape, because each section 52 of boom 50 is inflated directly and independently from the other sections 52, only the compromised section 52 would deflate, but all other sections 52 coming off of the reel 36 would be inflated in turn.

Figure 7:
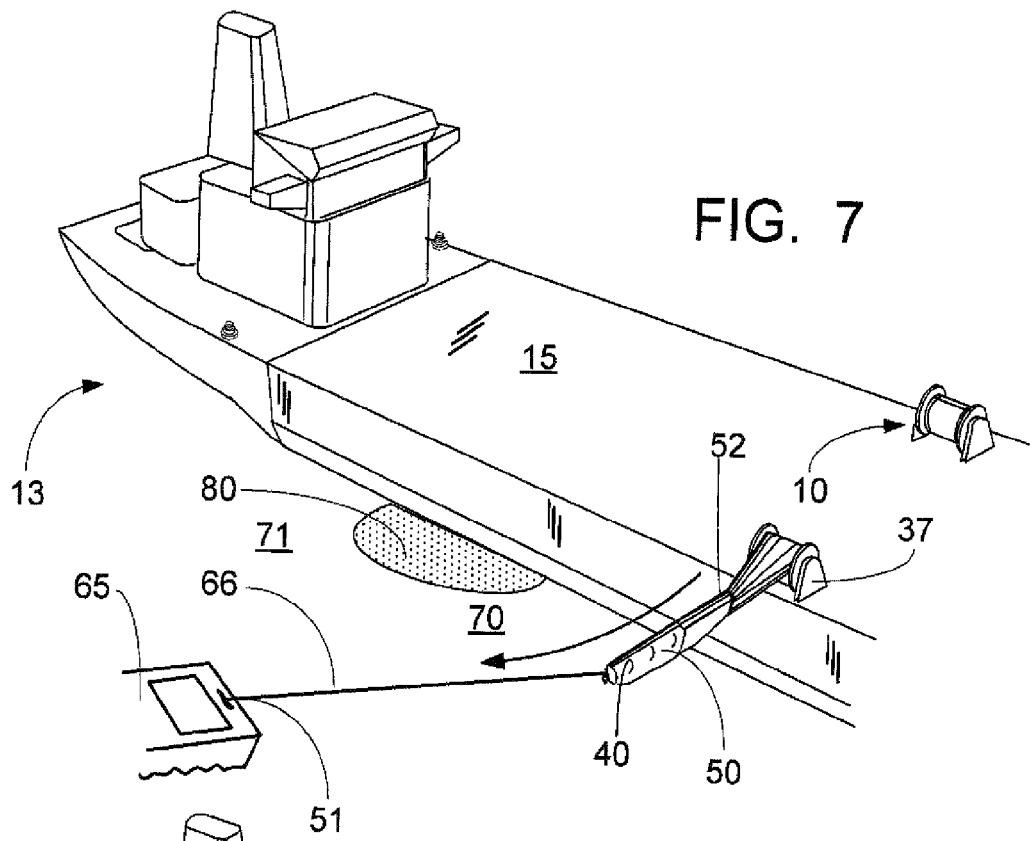
Figure 8:
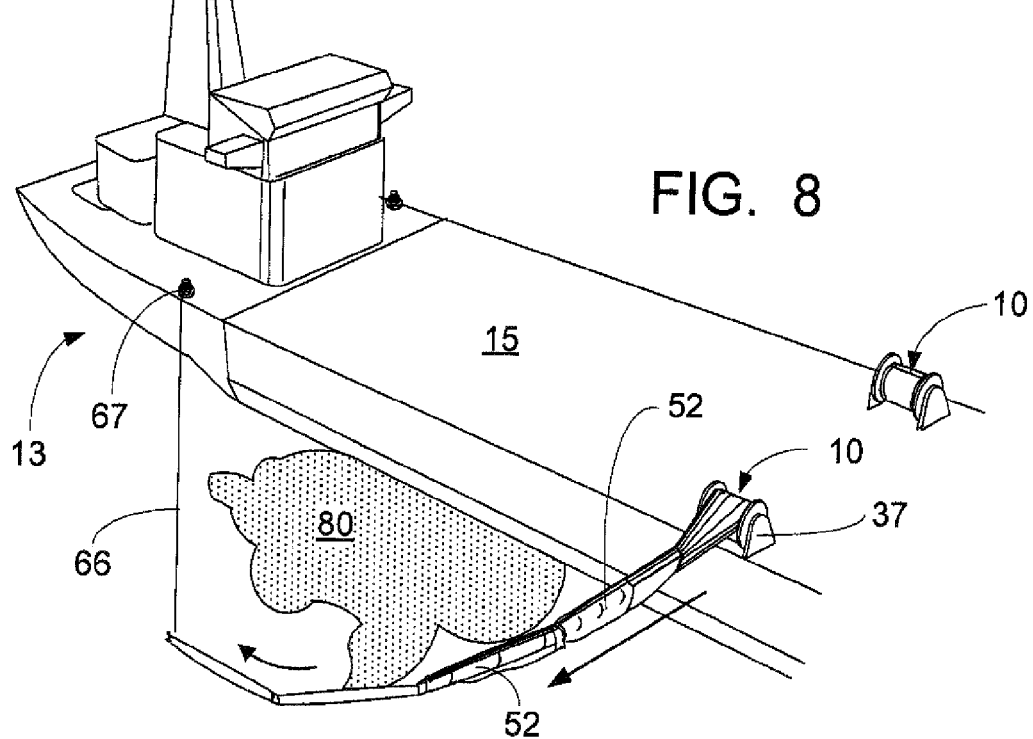

FIGS. 7-9 illustrate in sequential steps the preferred embodiment of the system of the present invention as it is being utilized on the deck 15 of a ship 13. As illustrated in FIG. 7, several of the systems 10, as constructed in the manner as shown in FIGS. 1 and 2 are onto the deck 15 of vessel 13. When in place, the base 37 of the system would be secured onto the deck 15 of tanker 13 and would be ready for use in the event there is a spill, with the necessary power and gas supply lines in order to make each system 10 fully operable. There is noted in FIG. 7 that an oil spill 80 has erupted which would usually be the result of a rupture in the wall 19 of the tanker and oil 81 or other type of petroleum is leaking onto the surface 71 of the body of water 70. At that point, the system 10 would be engaged and the air would be delivered into the air delivery line 40 along the entire length of the boom 50 which is wound on reel 36. In FIG. 7, a small boat 65 has attached itself to the end 51 of boom 50 and is pulling it off of the reel 36, via a line 66, and as was discussed in FIGS. 5 and 6, as a section 52 of boom 50 is pulled from the reel 36, since the air delivery line 40 has delivered air to the entire length of boom 50, the section 52 being pulled from the reel is inflated.

As an alternative, as seen in FIGS. 8 and 9, the boat 65 would not utilized, and its place the boom 50 would delivered through a system of winches onboard the vessel 13, and a guide or lead line 66 around the oil spill 80. As seen in FIG. 8, the lead section 52 of the boom is secured to the end of the lead line 66 has been attached to an onboard winch 67 on the vessel 13. As seen in FIG. 9, the boom 50 has been pulled from the tanker 13 so that the end 51 of the boom 50 reaches winch 67, basically encircling and entrapping the oil spill 80. At this point, the oil spill 80 could then be cleaned up via vacuuming or the like.

It should be noted that during the use of the system 10 to confine an oil spill 80, as seen in FIG. 10, should the entire length of boom 50 be deployed from the reel 36, the empty reel 36 may be removed from base 37 such that inflation of the deployed boom 50 is maintained and a next reel 36 containing boom 50 with inflatable gas delivery supply lines 40 may be positioned onto base 37 of the system 10. The inflatable delivery lines 40 associated with the previously deployed boom 50 may be connected at the lagging, or last-off end, of the boom 50 on the reel 36 that has been inserted in place of the reel 36 from which the prior section of boom 50 was deployed. This process, of course, could be repeated until the entire oil spill is confined by the boom 50.

The following is a list of parts and materials suitable for use in the present invention.

| PARTS LIST | |
|---|---|
| Part Number | Description |
| 10 | system |
| 12 | inflatable gas supply |
| 13 | vessel |
| 14 | manifold |
| 15 | vessel deck |
| 16 | hoses |
| 17 | inflatable gas (air) |
| 18 | motor |
| 19 | wall |
| 20 | control |
| 21 | rotoseal valve |
| 22 | boom inflation valve |
| 24 | pressure regulator |
| 26 | pressure regulator |
| 30 | arrow |
| 32 | arrow |
| 34 | brake/clutch |
| 36 | reel |
| 37 | base |
| 38 | sidewall |
| 39, 41 | ends |
| 40 | air delivery line |
| 42 | point |
| 43 | openings |
| 44 | belt |
| 45 | hub |
| 47 | housing |
| 50 | boom |
| 52 | section |
| 53 | inflatable chamber |
| 54 | stainless T fitting |
| 55 | skirt portion |
| 56 | deflation/inflation port |
| 57 | weighted lower end |
| 58 | arrow |
| 59 | point |
| 60 | jump hose |
| 65 | small boat |
| 66 | lead line |
| 67 | winch |
| 70 | water |
| 71 | surface |
| 80 | oil spill |
| 81 | oil |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An inflatable barrier deployment system mounted on a single floating vessel, for confining a material leaking from the floating vessel floatable on a liquid surface, comprising:
   a. a winch reel assembly located at a first point on the vessel, wherein the winch reel assembly comprises a rotatable reel and a motor;
   b. an inflatable barrier wound in multiple wound layers upon the reel, and wherein the inflatable barrier has a first end deployable from the reel;
   c. a gas supply line that is wound on the reel and runs externally and concurrently along the entire length of the inflatable barrier for delivering pressurized gas to the wound layers of the inflatable barrier while wound on the reel, and wherein the weight of the inflatable barrier wound on the reel prevents inflation of the inflatable barrier until it unwinds from the reel and is deployed from the vessel onto the liquid surface;
   d. a valve positioned in a core of the reel through which pressurized gas is delivered to the gas delivery line and to the entire length of inflatable barrier wound on the reel;
   e. a pneumatic system comprising a gas supply line and pneumatic supply, wherein the pneumatic system supplies pressurized gas via the gas supply line to the motor and through the valve in the core of the reel to the gas delivery line;
   f. wherein activation of the pneumatic system enables simultaneous powering of the winch-reel assembly through pressurized gas supplied to the motor, for enabling rotation of the reel for deployment of the inflatable barrier, while also supplying pressurized gas to the gas supply line wound on the reel and to the entire length of inflatable barrier, for enabling inflation of the inflatable barrier as it begins to unwind from the reel; and
   g. a means comprising first and second ends wherein the first end of the means is secured to a first end of the inflatable barrier and wherein the second end of the means is capable of being attached to another fixed point on the vessel or off the vessel, or is capable of being moved across and around the vessel as the inflatable barrier is being deployed, inflated or maintained for providing directional control to the inflatable barrier without requiring use of a separate vessel, and for defining and changing the direction of deployment of the inflatable barrier to define a confinement area in which the floatable material is confined,
   wherein pressurized gas is deliverable via the gas supply line to an entire length of the inflatable barrier while the inflatable barrier is wound on the reel.

2. The deployment system in claim 1, wherein the pressurized gas enters the gas supply line wound on the reel at a point other than the first-off or last-off section of the inflatable barrier.

3. The deployment system in claim 1, wherein the pressurized gas first enters the gas supply line wound on the reel at a point not concurrent with the last-off section of inflatable barrier.

4. The deployment system in claim 1 wherein the pace of deployment of the inflatable barrier is controlled through the pneumatic system.

5. The deployment system in claim 1 wherein deployment of the inflatable barrier is not dependent upon pulling the inflatable barrier from the device on which it is housed.

6. The deployment system in claim 1 wherein the pressurized gas comprises pressurized air.

7. The deployment system in claim 1 wherein the gas supply line supplies pressurized gas into the inflatable barrier through multiple connecting hoses connecting multiple outlets on the gas supply line to multiple inlets on the inflatable barrier while at least some of the inflatable barrier is wound on the reel.

8. The deployment system in claim 1 wherein the means in "e" is a guide wire used to control the direction and movement of the inflated barrier.

9. The deployment system in claim 1 wherein the pressure of pressurized gas in the gas supply line is equal to or less than the maximum pressure tolerated by the inflatable barrier or any portion of the inflatable barrier.

10. The deployment system in claim 1 wherein the pressure of pressurized gas in the gas supply line is sufficiently high to attain inflation of the inflatable barrier after it unwinds from the reel and is deployed from the vessel.

11. An inflatable barrier deployment system from a vessel of the type having a hull for confining an oil spill on a surface of a body of water, comprising:
    a. a reel having a hollow core;
    b. a continuous length of inflatable barrier that is wound in multiple wound layers upon the reel, wherein the reel is located at a first location on the vessel;
    c. a gas delivery line that is wound on the reel and runs externally and concurrently along an entire length of the inflatable barrier, delivering pressurized gas via a plurality of ports to the entire length of the inflatable barrier while the inflatable barrier is wound on the reel;
    d. a valve positioned in a core of the reel through which pressurized gas is delivered to the gas delivery line and then to the entire length of inflatable barrier;
    e. a pnuematic system comprising a gas supply line and pneumatic supply, wherein the pnuematic system supplies pressurized gas to both the motor and through the valve to the gas delivery line;
    f. wherein activation of the pneumatic system deploys a filled barrier, wherein the system simultaneously supplies air to the entire length of the inflatable barrier while the inflatable barrier is wound on the reel and operates the reel for deployment of a filled barrier.

12. The system in claim 11 wherein the air line includes injection nozzles for delivering the inflatable gas to sections of inflatable barrier along the length of the inflatable barrier.

13. The system in claim 12 wherein the inflatable gas enters the air line at a point other than the first-off or last-off section of the inflatable barrier.

14. The system in claim 12 wherein the inflatable gas first enters the air line at a point concurrent with the last-off section of inflatable barrier.

15. The system in claim 12 wherein the air line is attached to the inflatable barrier.

16. The system in claim 12 wherein the pressure of inflatable gas in the air line is equal to or less than the maximum pressure tolerated by the inflatable barrier or any portion of the inflatable barrier.

17. The system in claim 12 wherein the pressure of inflatable gas in the air line is sufficiently high to attain inflation of the inflatable barrier as it is deployed from the vessel.

18. The system in claim 11 wherein the pace of deployment of the inflatable barrier is controlled through pneumatic means.

19. The system in claim 11 wherein deployment of the inflatable barrier is not dependent upon pulling the inflatable barrier from the device on which it is housed.

20. The system in claim 11 wherein the air line supplies inflatable gas into the inflatable barrier through a jumper hose connecting an outlet on the air line to an inlet on the inflatable barrier.

21. The system in claim 11 further comprising a first end of a guide wire attached to the first-off section of inflatable barrier and another end of the guide wire used to control the direction and movement of the inflatable barrier.

22. A method of deploying an inflatable barrier from a vessel floating in a body of water and which is carrying a floatable material, for confining the floatable material between a first and second location on the vessel which has leaked from the vessel onto a surface of the body of water, comprising the steps of:
   a. providing a winch reel assembly comprising a reel having a hollow core, a valve positioned in the core of the reel, and a motor;
   b. providing an inflatable barrier wound in multiple wound layers upon the reel and positioning the reel at a first location on the vessel;
   c. providing a delivery hose wound on the reel, running concurrently and externally along the length of the inflatable barrier, wherein the valve in the core of the reel is for delivering pressurized gas to the delivery hose and then to the entire length of inflatable barrier while the inflatable barrier is wound on the reel;
   d. providing an inflatable gas supply from the vessel for delivering pressurized gas to the valve in the core of the reel;
   e. delivering the inflatable gas under a selected pressure from the inflatable gas supply to the motor and also to the valve in the core of the reel, to the delivery hose that is wound on the reel and then to the entire length of wound layers of inflatable barrier wound on the reel for inflating that portion of the inflatable barrier after a first end of the inflatable barrier unwinds from the reel to define an inflated barrier as the barrier is deployed onto the surface of the water; and
   f. securing the first end of the inflated barrier at a second location on or off the vessel to define a space on the surface of the body of water into which an oil spill is confined on the surface of the water by the inflated barrier extending around the oil spill between the first and second locations.

23. The method in claim 22, wherein the inflatable gas supply is provided by a gas supply on the vessel.

24. The method in claim 22, wherein the inflatable gas comprises pressurized air.

25. The method in claim 22, wherein the reel is driven by a motor mounted to the reel; the motor driven by pressurized air.

26. The method in claim 22, whereby when a reel has released all of the inflatable barrier from the reel, the reel can be replaced with a new reel with inflatable barrier to undertake the method in claim 22.

27. The method in claim 22, wherein each section of inflatable barrier receives pressurized gas independent of any other section of inflatable barrier on the reel.

28. The method of claim 22 further comprising providing a means comprising first and second ends for providing directional control of the inflatable barrier as it is being deployed, and wherein in step "f" the first end of the means is secured to a first end of the inflatable barrier and the second end of the means is moved across and around the vessel as the inflatable barrier is being deployed, inflated or maintained, for defining and changing the direction of deployment of the inflatable barrier, and wherein the means is secured to another fixed point on the vessel or off the vessel, to define a confinement area in which the floatable material is confined.

29. An inflatable barrier deployment system from a single vessel for confining an oil spill derived from the single vessel, comprising:
   a. a reel having a hollow core that can be pressurized and wherein the reel is located at a first location on the vessel;
   b. an inflatable barrier comprising a continuous length of boom that is wound in multiple wound layers upon the reel;
   c. a gas line that is wound on the reel and runs externally and concurrently along the length of the boom;
   d. a pneumatic system for simultaneously operating the reel and delivering inflatable gas via a delivery hose to the core of the reel, wherein the inflatable gas travels from a source on the vessel for delivering inflatable gas to the core of the reel to the gas line that is wound on the reel and then into sections of boom along the length of the boom wound on the reel under a certain pressure sufficiently high to attain inflation of the boom after the boom is unwound from the reel at a point substantially concurrent with the last-off section of the boom;
   e. the reel being rotatable for enabling the boom to be unwound from the reel when necessary;
   f. a first end of a guide wire attached to the first-off section of boom and a second end of the guide wire used to control the direction and movement of the boom; and
   g. a second location on the vessel for securing the second end of the guide wire attached to the first-off section of the boom so that the first-off section of the boom is moved in the water to the second location on the vessel to define a space in the water between the first and second locations to confine the oil spill.

30. The inflatable barrier deployment system in claim 29, wherein the vessel may comprise a ship, a floating oil rig or a stationary or floating dock.

31. An inflatable barrier deployment system from a single vessel for confining a material floatable on a liquid surface comprising:
   a. a winch reel assembly located at a first point on the vessel, wherein the winch reel assembly comprises a rotatable reel and a motor;
   b. an inflatable barrier wound on the reel;
   c. a gas supply line wound on the reel, running externally and concurrently along the length of the inflatable barrier, for delivering pressurized gas to the entire length of inflatable barrier while the inflatable barrier is wound on the reel;
   d. a pneumatic system comprising a pressurized source of gas, wherein the pneumatic system enables simultaneous powering of the winch reel assembly through inflatable gas supplied to the motor for enabling rotation of the reel for deployment of the inflatable barrier, while also supplying inflatable gas to the gas supply line wound on the reel and to the entire length of inflatable barrier, for enabling inflation of the inflatable barrier as it begins to unwind from the reel; and
   e. a means comprising first and second ends wherein the first end of the means is secured to a first end of the inflatable barrier and wherein the second end of the means is capable of being attached to a second fixed point on the vessel or off the vessel, for defining and changing the direction of deployment of the inflatable barrier to define a confinement area in which the floatable material is confined.

* * * * *